United States Patent
Callamand et al.

(10) Patent No.: US 7,461,678 B2
(45) Date of Patent: Dec. 9, 2008

(54) CROWN REINFORCEMENT FOR A RADIAL TIRE

(75) Inventors: Stèphane Callamand, Gunma (JP); Philippe Gervais, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 2 days.

(21) Appl. No.: 11/201,986

(22) Filed: Aug. 11, 2005

(65) Prior Publication Data

US 2006/0032571 A1    Feb. 16, 2006

Related U.S. Application Data

(63) Continuation of application No. PCT/EP2004/001361, filed on Feb. 13, 2004.

(30) Foreign Application Priority Data

Feb. 17, 2003    (FR) .................................. 03 01905

(51) Int. Cl.
*B60C 9/18* (2006.01)
*B60C 9/20* (2006.01)
(52) U.S. Cl. ....................... 152/532; 152/534
(58) Field of Classification Search .................. 152/532, 152/534, 535
See application file for complete search history.

(56) References Cited

U.S. PATENT DOCUMENTS

| | | | |
|---|---|---|---|
| 3,195,604 A * | 7/1965 | Boussu et al. ............... | 152/535 |
| 3,543,828 A | 12/1970 | Caille | |
| 4,082,132 A | 4/1978 | Kajimura et al. | |
| 4,086,948 A | 5/1978 | Suzuki et al. | |
| 4,446,905 A | 5/1984 | Tamura et al. | |
| 7,172,000 B2 * | 2/2007 | Ferlin ..................... | 152/534 X |
| 2002/0007890 A1 * | 1/2002 | Torresani | |
| 2006/0032570 A1 * | 2/2006 | Callamand et al. .......... | 152/532 |

FOREIGN PATENT DOCUMENTS

| | | | |
|---|---|---|---|
| EP | 1 167 079 | | 1/2002 |
| FR | 2 493 236 | | 5/1982 |
| FR | 2 800 672 A1 | * | 5/2001 |
| FR | 2 836 655 A1 | * | 9/2003 |
| JP | 59-118507 | | 7/1984 |
| JP | 3-262704 | | 11/1991 |
| JP | 4-55104 | | 2/1992 |
| JP | 07323703 A | * | 12/1995 |

* cited by examiner

*Primary Examiner*—Adrienne C Johnstone
(74) *Attorney, Agent, or Firm*—Cohen Pontani Lieberman & Pavane LLP

(57) ABSTRACT

A tire includes a radial carcass reinforcement surmounted radially by a crown reinforcement including a working reinforcement having two working crown plies of calendered inextensible metallic reinforcement elements and rubber mix. The reinforcement elements are parallel to each other within each ply and are crossed from one ply to the next, forming with the circumferential direction respective angles $\alpha_1$ and $\alpha_2$ of between 10° and 45°. The working crown plies have respective axial widths $L_1$ and $L_2$. The tire also includes a protective ply of metallic reinforcement elements with an axial width $L_3$ such that $L_2 < L_3$, $L_2$ being the width of the working ply adjacent to the protective ply. A layer of cohesive rubber mix GB is arranged radially internal to the working reinforcement such that the axially outer end of the layer GB is at a distance from the equatorial plane greater than $L_1/2$.

13 Claims, 2 Drawing Sheets

CROWN REINFORCEMENT FOR A RADIAL TIRE

CROSS-REFERENCE TO RELATED APPLICATIONS

This application is a U.S. Continuation Application under 35 USC 371 of International Application PCT/EP2004/001361 filed Feb. 13, 2004.

BACKGROUND OF THE INVENTION

1. Field of the Invention

The present invention relates to a tire having a radial carcass reinforcement, which is intended to be fitted on heavy vehicles such as lorries, buses, tractors, trailers etc., and relates more particularly to the crown reinforcement of such a tire.

Generally, the radial carcass reinforcement of the tire in question, which is formed of inextensible reinforcement elements made of metal or of aromatic polyamide, is surmounted radially by a crown reinforcement comprising a plurality of crown plies; in particular a triangulation ply formed of metallic elements which are oriented relative to the circumferential direction by a large angle of between 45° and 90°, said triangulation ply in turn being surmounted by two working plies formed of inextensible metallic reinforcement elements which are parallel to each other within each ply and are crossed from one ply to the next, forming angles of between 10° and 45° with the circumferential direction. Said working plies, which form the working reinforcement, may also be covered by at least one so-called protective ply, formed of generally metallic, extensible reinforcement elements, which are referred to as elastic elements.

Cables are said to be inextensible when said cables have a relative elongation at most equal to 0.2% under a tensile force equal to 10% of the breaking load.

Cables are said to be elastic when said cables have a relative elongation at least equal to 4% under a tensile force equal to the breaking load.

The circumferential direction of the tire, or longitudinal direction, is the direction corresponding to the periphery of the tire and defined by the direction of rolling of the tire.

The transverse or axial direction of the tire is parallel to the axis of rotation of the tire.

The radial direction is a direction intersecting and perpendicular to the axis of rotation of the tire.

The axis of rotation of the tire is the axis around which it rotates in normal use.

A radial or meridian plane is a plane containing the axis of rotation of the tire.

2. Description of the Related Art

The circumferential median plane, or equatorial plane, is a plane perpendicular to the axis of rotation of the tire and which divides the tire into two halves.

SUMMARY OF THE INVENTION

In the case of tires for "heavy vehicles", a single protective ply is usually present and its protective elements are in most cases oriented in the same direction and at the same angle in absolute value as those of the reinforcement elements of the radially outermost and hence radially adjacent working ply. In the case of construction-vehicle tires which are intended to travel on relatively bumpy roads, the presence of two protective plies is advantageous, the elastic elements being crossed from one ply to the next and the reinforcement elements of the radially inner protective ply being crossed with the inextensible reinforcement elements of the radially outer working ply adjacent to said radially inner protective ply.

Application JP 59/118 507, with the aim of avoiding separation between crown plies, shows such a reinforcement structure with a radially outer ply on one hand formed of high-modulus textile reinforcement elements forming with the circumferential direction an angle which in absolute value is smaller than the angle formed by the elements of the radially outer working ply, and on the other hand having an axial width greater than the width of said working ply, while remaining less than the width of the radially inner working ply.

Application JP 03/262 704, with the same aim, describes and shows a solution very close to the previous one as far as the axial widths of the plies and angles of the reinforcement elements of said plies are concerned. Furthermore, it specifies that the radially outermost ply has an elongation at break of at least 5%.

With the aim of protecting the working plies from corrosion, and avoiding separation between the crown reinforcement and tread, document JP 04/055 104, which adopts practically the same axial widths of crown plies, advocates using reinforcement elements of aromatic polyester for the protective ply.

French Patent 2 493 236, with the aim, it would seem, of solving the problems posed by travel on a rough road, advocates a structure similar to the previous ones, but with use in the radially inner and outer plies of reinforcement elements, the elongation at break of which is greater by at least 40% than the elongation at break of the reinforcement elements of the two working plies.

The progress made in terms of length of wear life (number of kilometers traveled) of "heavy-vehicle" tires, and also the possibility of easy, economical subsequent retreading, requires a crown reinforcement, the resistance to separation between the edges of working plies of which is improved.

Patent FR 2 800 672, in order to limit separation at the ends of working plies, claims a crown reinforcement structure in which a ply, referred to as a protective ply, has an axial width between those of the working crown plies, the reinforcement elements of the protective ply being inclined in the same direction as the reinforcement elements of the radially adjacent working ply and forming with the circumferential direction an angle greater, by at least 5°, than that of said radially adjacent working ply.

In their research and in particular during research into the production of "heavy-vehicle" tires having an increasingly long wear life (number of kilometers traveled), the inventors set themselves the task of defining a tire crown structure which makes it possible to obtain a resistance to separation between the edges of working plies which is improved still further.

This object has been achieved according to the invention by a tire comprising a radial carcass reinforcement radially surmounted by a crown reinforcement consisting of at least one working reinforcement formed of two plies of calendered inextensible metallic reinforcement elements, of rubber mix which are parallel to each other within each ply and are crossed from one ply to the next, forming angles $\alpha_1$ and $\alpha_2$ of between 10° and 45° with the circumferential direction, said working plies having axial widths $L_1$ and $L_2$, and of at least one supplementary ply, referred to as a protective ply, of axial width $L_3$ such that $L_2 < L_3$, $L_2$ being the width of the working ply adjacent to the protective ply, and comprising metallic reinforcement elements, said tire furthermore comprising a layer of cohesive rubber mix GB radially to the inside of the working reinforcement, the axially outer end of said layer GB being at a distance from the equatorial plane greater than $L_1/2$.

A cohesive rubber mix is a rubber mix which is particularly resistant to cracking.

According to a preferred embodiment of the invention, the layer of cohesive rubber mix GB has a thickness of between 0.6 and 1.4 mm.

More preferably according to the invention, the layer of cohesive rubber mix GB is in contact with the radially inner working crown ply and more preferably the axial width of the layer of cohesive rubber mix GB between the axially inner end of said layer of cohesive rubber mix GB and the end of the radially inner working crown ply is greater than 5 mm.

A tire such as has been defined above according to the invention, that is to say having a crown structure such as described, makes it possible to reduce the risks of separation between the edges of working plies and thus to improve the life of the tire by permitting in particular retreading thereof. The presence of the layer of cohesive rubber mix GB in combination with the supplementary ply referred to as a protective ply results in an improvement in the resistance to separation between the edges of working plies.

According to an advantageous variant of the invention, the width $L_3$ of the protective ply is such that $L_3<L_1$. In other words, the protective ply has an axial width less than the axial width of the radially inner working crown ply and therefore lies between the axial widths of the two working crown plies. During the research, it was demonstrated that it was in particular preferable to avoid the ends of the protective ply and of the radially inner working crown ply axially coinciding. Such a structure would be harmful with regard to the separation between the edges of the two working crown plies.

Advantageously also, independently of the above relationship between the axial widths of the radially inner working crown ply and the protective crown ply, the axial width of the radially inner working crown ply is greater than the axial width of the radially outer working crown ply. In other words, the widths $L_1$ and $L_2$ of the working crown plies advantageously satisfy the relationship: $L_1 > L_2$.

According to a preferred embodiment of the invention, in particular to ensure sufficient drift rigidity of the tire, the widths of the working crown plies satisfy the relationship:

$$1 > L_2/L_1 \geq 2/3.$$

One preferred embodiment of the invention provides for the reinforcement elements of the protective ply to be inclined in the same direction as the reinforcement elements of the radially adjacent working ply, forming with the circumferential direction an angle $\alpha_3$ of the same direction and greater than or equal to the angle $\alpha_2$ of the reinforcement elements of said working ply adjacent to the protective ply.

Preferably, the angle $\alpha_3$, formed by the reinforcement elements of the protective ply with the circumferential direction, is greater than or equal in absolute value to the angle $\alpha_2$ of the elements of said radially adjacent working ply by at least 5°.

More preferably still, the angular difference $\alpha_3-\alpha_2$ is at most equal to 20°.

If said difference is less than 5°, the resistance to separation between working plies is not improved; if the difference is greater than 20°, it is possible that the separation between the edges of the two working plies will be adversely affected, contrary to what is desired. The angle $\alpha_3$ is more advantageously less than 45°.

In an advantageous variant of the invention, the crown reinforcement is finished off, radially between the carcass reinforcement and the working reinforcement, by a triangulation ply formed of inextensible metallic elements, preferably forming with the circumferential direction an angle $\alpha_0$ of the same direction as the angle $\alpha_1$ formed by the reinforcement elements of the radially innermost working ply and of between 45° and 90°.

As is known per se, the addition between the working reinforcement and carcass reinforcement of what is called a triangulation ply may be advantageous, said ply being formed of metallic elements inclined greatly relative to the circumferential direction, and preferably having an axial width $L_0$ which is less than the width $L_1$ of the radially inner working crown ply.

According to this variant embodiment of the invention, when the crown reinforcement comprises a triangulation ply radially between the carcass reinforcement and the working reinforcement, the layer of rubber mix GB is either radially internal to said triangulation ply, or radially, at least in part between, the radially inner working crown ply and the triangulation ply, and hence advantageously in contact with the radially inner working crown ply and in contact with the triangulation ply, the latter preferably being axially narrower than the radially inner working crown ply, or alternatively radially internal to the radially inner working crown ply and without contact with the triangulation ply.

According to one advantageous embodiment of the invention, in particular intended for "heavy-vehicle" applications, the protective ply is formed of steel cables which are extensible or referred to as elastic. Such metallic reinforcement elements of the protective ply advantageously have a relative elongation at least equal to 4% at break.

Another advantageous embodiment of the invention further provides, in particular to limit the risks of degradation of the tires due to the formation of cracks between the ends of the reinforcement elements of the working plies and to the propagation thereof, at least in each shoulder, a ply of reinforcement elements, advantageously of small diameter, which are parallel to each other in the ply and forming with the circumferential direction an angle of between 70 and 110°, the axially inner edge of said additional ply being radially adjacent to at least one edge of one of the plies of the crown reinforcement, and the axially outer edge of said additional ply preferably being radially internal to the edge of the ply to which the additional ply is adjacent.

The edge of a ply is defined as a limited zone of the ply defined axially by one end of said ply.

One advantageous embodiment of the invention provides for the reinforcement elements of the additional shoulder ply to be what is referred to as of small diameter, compared with the compacted diameter of the metallic elements of the working crown plies of the tire, when said compacted diameter is less than 0.5 times the compacted diameter of the metallic elements of the working crown plies of the tire.

More preferably still, the compacted diameter of the reinforcement elements of the additional ply is less than 1 mm.

The compacted diameter is the measured diameter of a reinforcement element when the cords forming it are in contact with each other.

These diameters of the reinforcement elements of the additional ply allow the presence of said ply without said reinforcement elements, and more particularly their ends, being a new source of risk of degradation within the tire.

It appears that a ply of this type produced in accordance with the invention very significantly improves the resistance of the tire to impacts affecting the shoulder.

The reinforcement elements of the additional ply may be of textile or metallic type.

According to one advantageous embodiment of the invention and more particularly in the case of an additional shoulder ply, the axially outer edge of which is located at least in the radially upper part of the zone of the sidewall, the reinforcement elements of said additional ply are metallic; it would appear that the tire according to the invention then meets another requirement, because a tire thus produced makes it possible to limit the risks of degradation due to the generation of heat appearing owing to the hysteresis of the elastomers without furthermore adversely affecting the other desired properties of the rubbers or more directly of the tires.

Said reinforcement elements are then, more preferably still, made of steel, steel being recognized as being a very good conductor of heat.

The tire according to the invention, by the presence of the additional plies located at the shoulders, permits rapid evacuation of the heat produced during travel towards the outer surface of the tire, because the positioning of the additional plies makes it possible to conduct the heat towards the sidewall zones where the rubber mass is less great and therefore permits more rapid evacuation of heat even if the nature of the rubber is not more favorable to good conduction; the low thickness in fact enables the heat to be eliminated more rapidly, the path to be traveled being short from the heart of the rubber mass towards the outer surface. The tire according to the invention thus makes it possible to reduce the operating temperatures which might lead to a reduction in the life of the tires.

According to a preferred embodiment of the invention, the additional ply has its axially inner edge adjacent radially to the outside to the edge of the protective ply.

According to this embodiment of the invention, the additional ply is advantageously in contact with the layer of rubber mix P which makes it possible to decouple the free ends of the reinforcement elements of the different working plies.

Furthermore, the axially outer edge of the additional shoulder ply is for its part advantageously axially adjacent to the profiled element of rubber mix, one of the wings of which, as is known per se, provides the join between the carcass reinforcement and the edges of the radially innermost crown reinforcement plies, and the other wing of which passes down into the sidewall. This results in the axially outer edge of the additional shoulder ply being radially internal to the axially outer end of the layer of cohesive rubber mix GB.

According to this latter embodiment, the additional ply makes it possible on one hand to limit the formation and the propagation of cracks in the zones of the ends of the reinforcement elements and, on the other hand, to provide protection from the risks linked to impacts on the sidewall zones. Furthermore, the additional ply permits evacuation of the heat generated in the shoulder zone.

BRIEF DESCRIPTION OF THE DRAWINGS

Other advantageous details and characteristics of the invention will become apparent hereafter from the description of the examples of embodiment of the invention with reference to FIGS. 1 to 2, which represent.

The figures are not shown to scale in order to simplify understanding thereof.

DETAILED DESCRIPTION OF THE PREFERRED EMBODIMENTS

Figure 1:
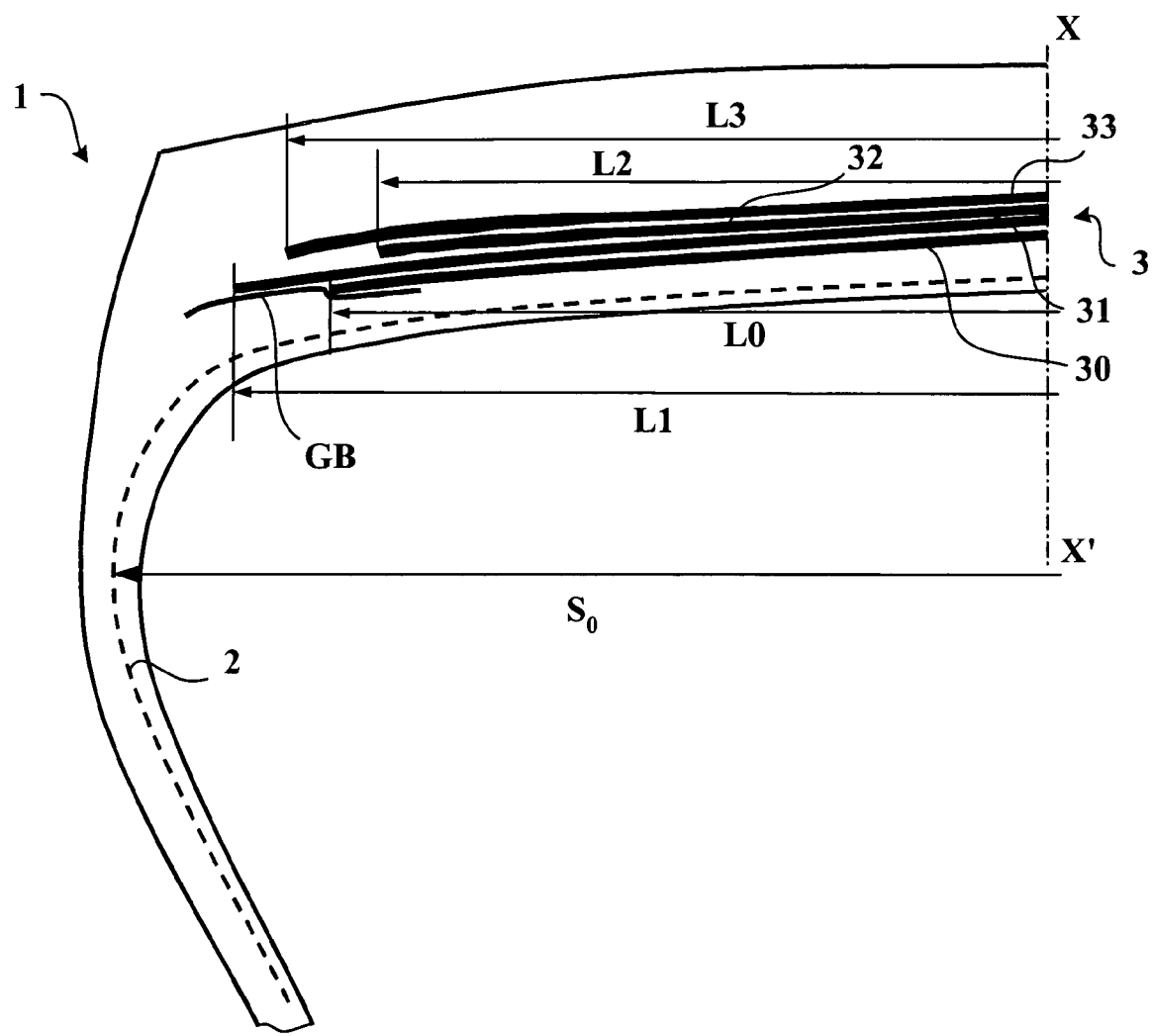
FIG. 1: a partial view in meridian section of a diagram of a tire according to one embodiment of the invention.

FIG. 1 shows a partial diagrammatic view in meridian section of a tire 1 of dimension 385/65.R.22.5 X. The figures show only a half-view of the tires which are extended symmetrically to the axis XX' which represents the circumferential median plane, or equatorial plane, of a tire.

The tire 1 comprises a radial carcass reinforcement composed of a single ply 2 of inextensible metal cables, that is to say, cables which have an elongation of at most 0.2% under a tensile force equal to 10% of the breaking load. Said carcass reinforcement is anchored within each bead; said beads are not shown in the figures. It is surmounted, radially to the outside, by a crown reinforcement 3 comprising radially from the inside to the outside:

a first crown ply 30 referred to as a triangulation ply, formed of inextensible metal cables made of steel, which are oriented at an angle $\alpha_0$, equal in the case described to 50°, radially surmounting said ply 30, a first working crown ply 31, formed of inextensible metal cables made of steel forming with the circumferential direction an angle $\alpha_1$ equal to 18°, the cables of the triangulation ply 30 and of the first working ply having the same direction, radially to the outside of the working crown ply 31, a second working crown ply 32 formed of metal cables identical to those of the first ply 31, and forming with the circumferential direction an angle $\alpha_2$ opposed to the angle $\alpha_1$ and, in the case illustrated, equal in absolute value to said angle $\alpha_1$ of 18°, (but possibly being different from said angle $\alpha_1$), and finally, radially to the outside of the working crown ply 32, a last ply 33 of what are called elastic metal cables made of steel, which are oriented relative to the circumferential direction by an angle $\alpha_3$ of the same direction as the angle $\alpha_2$, but greater in absolute value than said angle $\alpha_2$ of 8° since it is equal to 26°, this last ply being what is called a protective ply.

The axial width $L_1$ of the first working ply 31 is equal to 0.78 times the maximum axial width $S_0$ of the centre section of the carcass reinforcement 2 when the tire is mounted on its operating rim and inflated to its recommended pressure, namely 280 mm, which, for a tire of conventional form, is less than the width of the tread, which is equal, in the case in question, to 286 mm. The axial width $L_2$ of the second working ply 32 is less than the width $L_1$, since it is equal to 212 mm. The axial width $L_0$ of the triangulation ply 30 is equal to 270 mm, which represents 0.75 $S_0$. The width $L_3$ of the protective ply 33 is greater than the width $L_2$ of the least wide and radially adjacent working ply 32, and equal to 260 mm and hence less than the width $L_1$.

The tire 1 furthermore comprises a layer of rubber mix GB radially to the inside of the working reinforcement. This layer of rubber mix GB is put in place such that the axially outer end of said layer GB is at a distance from the equatorial plane XX' greater than $L_1/2$, $L_1$ being the axial width of the first working ply 31.

It turns out that the combination according to the invention of the layer of rubber mix GB, which is radially internal in contact with the end of the working crown ply 31, and of the protective ply 33, of a width greater than the width of the radially outer working ply 32, makes it possible to improve the resistance to separation between the edges of working plies, in particular by improving the resistance to the propagation of cracks.

Figure 2:
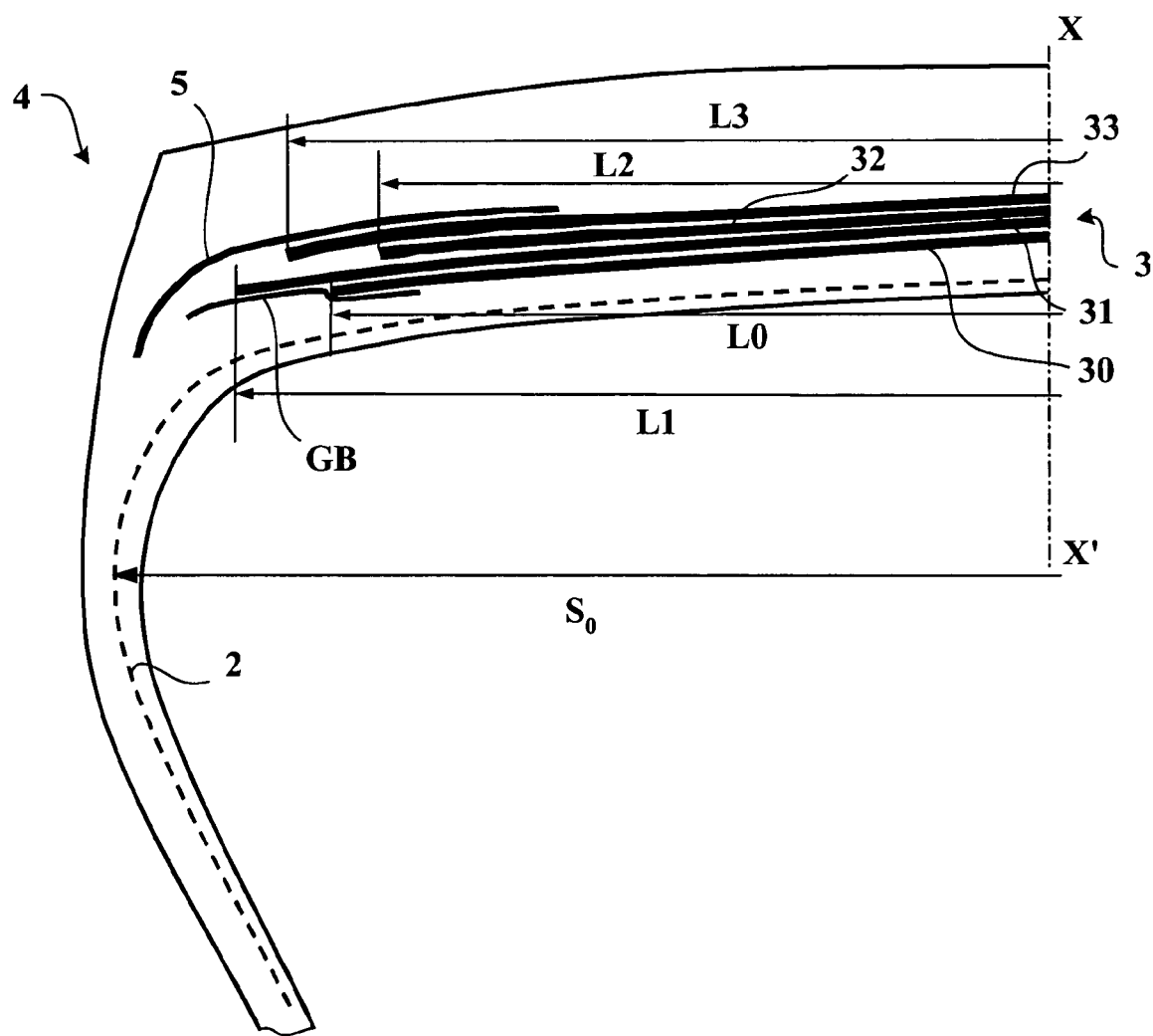
FIG. 2: a partial view in meridian section of a diagram of a tire according to a second embodiment of the invention.

FIG. 2 is a diagrammatic view in meridian section of a tire 4, similar to that of FIG. 1, which differs from the latter by the presence of a ply 5 of reinforcement elements, of small diameter, which are parallel to each other in the ply and oriented radially, the axially inner edge of said additional ply 5 being radially adjacent to at least one edge of the protective ply 33 of the crown reinforcement 3, and the axially outer edge of said additional ply being radially internal to the edge of the ply to which the additional ply 5 is adjacent. The presence of such an additional ply 5 makes it possible in particular to limit the appearance of cracks between the ends of the reinforcement elements of the working plies in particular by a mechanical and thermal protection effect as explained previously.

Tires described in accordance with FIG. 1 were subjected to endurance testing using running on vehicles and under high drift stresses in comparison with control tires, comprising a protective ply which is wider than the radially outer working ply but does not comprise a layer of mix.

Whereas the control tires on average covered 2,800 km, the tires according to the invention traveled for 3,800 km, or an increase of approximately 36%, without said tires being adversely affected by the separations observed between the two working plies.

The invention claimed is:

1. A tire comprising:
   a radial carcass reinforcement radially surmounted by a crown reinforcement comprising a working reinforcement, the working reinforcement comprising:
   at least two working crown plies of calendered inextensible metallic reinforcement elements and rubber mix, the at least two working crown plies comprising a radially inner working crown ply having an axial width $L_1$ and a radially outer working crown ply having an axial width $L_2$, the metallic reinforcement elements of the radially inner and outer working crown plies being parallel to each other within each working crown ply and being crossed from one working crown ply to the next, the metallic reinforcement elements of the radially inner and outer crown plies forming respective angles $\alpha_1$ and $\alpha_2$ of between 10° and 45° with the circumferential direction;
   a protective ply comprising metallic reinforcement elements and having an axial width $L_3$, the protective ply being adjacent to the radially outer working crown ply; and
   a layer of cohesive rubber mix GB which is disposed radially inward of the working reinforcement,
   wherein an axially outer end of said layer of cohesive rubber mix GB is at a distance from an equatorial plane of the tire greater than $L_1/2$,
   wherein $L_2$ is less than $L_3$, and
   wherein $L_2$ is less than $L_1$, and
   at least in each shoulder, an additional ply of reinforcement elements, which are parallel to each other in the additional ply and forming with the circumferential direction an angle of between 70° and 110°,
   wherein an axially inner edge of said additional ply is radially adjacent to at least one edge of one of the plies of the crown reinforcement, and an axially outer edge of said additional ply is radially internal to both the axially outer end of the layer of cohesive rubber mix GB and an edge of the ply to which the additional ply is adjacent.

2. A tire according to claim 1, wherein the layer of cohesive rubber mix GB has a thickness of between 0.6 and 1.4 mm.

3. A tire according to claim 1, wherein an axial width of the layer of cohesive rubber mix GB between an axially inner end of said layer of cohesive rubber mix GB and an end of the radially inner working crown ply is greater than 5 mm.

4. A tire according to claim 1, wherein L3 is less than L1.

5. A tire according to claim 1, wherein the axial widths of the radially inner and outer working crown plies satisfy the relationship:

$$1 > L_2/L_1 \geq 2/3.$$

6. A tire according to claim 1, wherein the reinforcement elements of the protective ply are inclined in the same direction as the reinforcement elements of the radially outer working crown ply, forming with the circumferential direction an angle $\alpha_3$ of the same direction and greater than or equal to the angle $\alpha_2$ of the reinforcement elements of the radially outer working crown ply.

7. A tire according to claim 6, wherein the angle $\alpha_3$ is greater in absolute value than the angle $\alpha_2$ of the reinforcement elements of said radially outer working crown ply by at least 5°.

8. A tire according to claim 6, wherein the angular difference $\alpha_3 - \alpha_2$ is at most equal to 20°.

9. A tire according to claim 1, wherein the crown reinforcement is finished off, radially between the carcass reinforcement and the working reinforcement, by a triangulation ply comprising inextensible metallic elements.

10. A tire according to claim 9, wherein the inextensible metallic elements of the triangulation ply form with the circumferential direction an angle $\alpha_0$ of the same direction as the angle $\alpha_1$ formed by the reinforcement elements of the radially inner working crown ply and of between 45° and 90°.

11. A tire according to claim 9, wherein the layer of cohesive rubber mix GB is radially internal to said triangulation ply.

12. A tire according to claim 1, wherein the reinforcement elements of the protective ply comprise extensible steel cables.

13. A tire according to claim 1, wherein the axially outer edge of the additional ply is located at least in a radially upper part of the zone of a sidewall of the tire and wherein the reinforcement elements of said additional ply are metallic.

* * * * *